(12) United States Patent
Pessolano

(10) Patent No.: US 7,340,628 B2
(45) Date of Patent: Mar. 4, 2008

(54) BRANCH BASED ACTIVITY MONITORING

(75) Inventor: Francesco Pessolano, Eindhoven (NL)

(73) Assignee: NXP B.V., Eindhoven (NL)

( * ) Notice: Subject to any disclaimer, the term of this patent is extended or adjusted under 35 U.S.C. 154(b) by 146 days.

(21) Appl. No.: 10/550,335

(22) PCT Filed: Mar. 22, 2004

(86) PCT No.: PCT/IB2004/050300

§ 371 (c)(1),
(2), (4) Date: Sep. 22, 2005

(87) PCT Pub. No.: WO2004/086205

PCT Pub. Date: Oct. 7, 2004

(65) Prior Publication Data

US 2007/0011479 A1 Jan. 11, 2007

(30) Foreign Application Priority Data

Mar. 27, 2003 (EP) .................................. 03100792

(51) Int. Cl.
*G06F 11/34* (2006.01)
*G06F 1/32* (2006.01)

(52) U.S. Cl. ...................... 713/340; 712/233; 713/300; 713/320; 713/322

(58) Field of Classification Search ................ 712/233, 712/234, 235, 236, 237, 238, 239, 240, 241, 712/242, 243, 244; 713/300, 310, 320, 321, 713/322, 323, 324, 330, 340
See application file for complete search history.

(56) References Cited

U.S. PATENT DOCUMENTS 5,740,417 A * 4/1998 Kennedy et al. ............ 712/239
7,062,304 B2 * 6/2006 Chauvel et al. ............. 455/574

* cited by examiner

*Primary Examiner*—William M. Treat

(57) ABSTRACT

During execution of a program of computer instructions, the execution of branch instructions is detected, and in response, the activity of processing circuitry during execution of instructions following a branch instruction is measured. Respective information about the measured activity is recorded for each of a plurality of branch instructions. The measured activity is later used to adapt the power consumption mode of the processing circuitry after encountering the respective branch instructions.

11 Claims, 1 Drawing Sheet

BRANCH BASED ACTIVITY MONITORING

Figure 1:
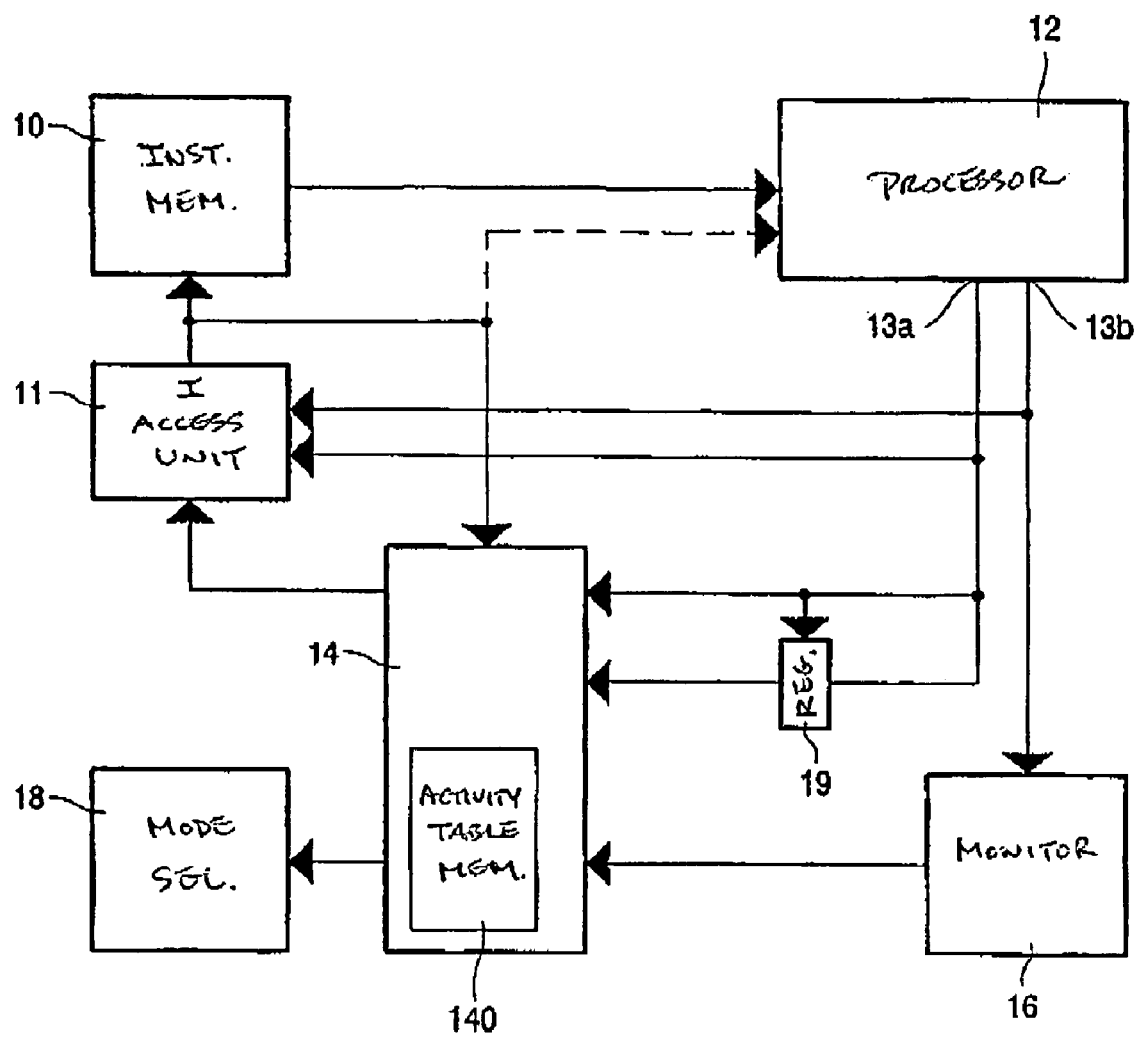

The invention relates to an instruction processing apparatus and a method for reducing the power supply consumption during execution of programs of instructions.

European patent application No. 1182556 discusses measures that can be taken to limit power supply consumption in computer devices. This patent application uses energy consumption as a criterion for scheduling tasks. Information about the activity involved in executing a task is used to compute a prediction of the power consumption by the task. This prediction is used to select when the task will be executed, or to select whether the task has to be executed in a degraded manner, which results in less power supply consumption. Thus, it may be avoided for example that a power supply consumption limit is exceeded, or power supply consumption may be minimized.

Of course, the predicted power supply consumption need not correspond exactly to the actual power supply consumption. Power supply consumption may be data dependent for example. EP 1182556 describes how, during execution of the scheduled tasks, the actual activity of the device, or of different parts of the device, is monitored. EP 1182556 describes that the actual measured activity may be used to reschedule tasks. This dynamic adaptation works only at task level. This affords only course grain, and therefore sub-optimal control over power supply consumption.

U.S. Pat. No. 6,282,663 describes another power saving technique. This patent notes that modern processors use speculative execution of instructions that follow conditional branch instructions. U.S. Pat. No. 6,282,663 describes how speculative execution can be suppressed selectively in a power saving mode. Speculative execution involves making a prediction of the outcome of a conditional branch instruction. Preferably, the prediction is based on statistical information about previous executions of the conditional branch instruction. For this purpose a branch history table is used with entries for branch instructions at different locations in a program and information about the frequency with which the branch instructions have been taken is entered in the entries. It is assumed that the most frequent outcome of the branch will be repeated and the corresponding instructions are executed speculatively. However, in a power saving mode speculative execution is suppressed when the prediction is not sufficiently certain.

More generally, as noted in EP 1182556, it has been known to reduce power supply consumption by reducing the clock frequency and/or power supply voltage of processing devices. There are limits to this technique, however, because it increases execution time of programs, which may conflict with real time requirements or with an imposed performance power supply consumption ratio. Hence, such techniques cannot be applied further than allowable under constraints imposed on execution time.

Among others, it is an object of the invention to provide for a fine grain measurement of activity during execution of a program of instruction in a way that can be used for adaptation of execution of the program, preferably for adapting power supply consumption.

Among others, it is a further object of the invention to provide for such a fine grain measurement of activity that requires little overhead circuitry.

The instruction processing apparatus according to the invention is set forth in Claim 1. According to the invention, detection of execution of branch instructions is used to trigger the start of time intervals in which activity in the apparatus is measured. Preferably, the activity during a time interval that includes execution of the instructions up to a next branch instruction is measured. Information about the measured activity for a particular branch instruction is stored so that it can be retrieved selectively on the basis of an identification of the branch instruction. Thus data dependent measurements of activity can be obtained and recorded.

Preferably, the information about the measured activity is used to adapt a power supply consumption mode in conjunction with the execution of the branch instructions, dependent on the information about the measured activity. Thus, for example, the power supply mode may be adapted to reduce the power supply voltage and clock frequency during execution of instructions after a branch that previously involved high activity and not if these instructions involved low activity.

The use of branch instructions to trigger time intervals for which activity is recorded enables a fine grain analysis of activity, with good predictivity of activity. Branch instructions typically mark sections of programs that contain instructions with related activity, which makes program sections bounded by branch instructions a convenient unit for adapting the power supply consumption mode.

For storage of the information about the measured activity preferably a branch history table is used that of a type used for branch prediction, but according to an embodiment of the present invention this table stores information about the measured activity following a branch. The invention may be applied independent of branch prediction, but preferably the table is also used for storing information about the outcome of the branch, for use in branch prediction.

It is not necessary to store information about the measured activity for all branch instructions. Preferably information is stored only for more frequently or more recently executed branch instructions. For other branch instructions a default activity may be assumed. Thus, memory space for storing the information can be saved and because the most frequent and/or most recent instructions dominate the effect of activity near optimal adaptation of the processing mode is still possible.

Although the invention may use storage structure similar to those used for branch history tables used for branch prediction, differences with the storage structure for branch prediction may exist. For example, respective information about the measure of activity may be stored for each outcome of the branch instruction, to be used according to the outcome. As another example, the information may be accessed just as for branch prediction, with the instruction address of the branch instruction, but instead a later address, which follows the branch instruction during execution, may be used or access may be subject to detection of the branch instruction by the processing circuitry, rather than just in terms of its instruction address.

These and other objects and advantageous aspects of the invention will be described using the following figure.

FIG. 1 shows a processing apparatus.

FIG. 1 shows a processing apparatus with an instruction memory 10, an addressing unit 11, processing circuitry 12, a branch history storage unit 14, an activity monitor 16, a mode selection unit 18 and a branch data register 19. The apparatus may be implemented as an integrated circuit device. Instruction memory 10 has an address input coupled to an address output of addressing unit 11 and an instruction output coupled to processing circuitry 12. Processing circuitry 12 is coupled to the address output of addressing unit 11. Processing circuitry 12 has branch instruction signaling outputs 13a,b. A first output 13a is used to signal when a branch instruction has been detected and a second output 13b is used to signal information about the detected branch instruction. The first output 13a is coupled to addressing unit 11, activity monitor 16, branch history storage unit 14 and register 19. The second output 13b is coupled to addressing unit 11 and branch data register 19. Branch history storage unit 14 contains an activity table memory 140. Branch history storage unit 14 has an input coupled to the address output of addressing unit 11 and outputs coupled to addressing unit 11 and mode selection unit 18.

In operation, branch history storage unit 14 records, for each of a number of respective branch instructions, respective information about a measure of activity of the apparatus subsequent to the branch instruction. When a particular branch instruction is executed again, branch history storage unit 14 supplies the information about the measure of activity for the branch instruction to mode selection unit 18. In response, mode selection unit 18 adapts a mode of execution during execution of instructions that follow the branch instruction, dependent on the recorded information about the measure of activity of the device during previous execution of the execution of instructions that follow the branch instruction. For example, mode selection unit 18 sets the supply voltage and the clock frequency of the device to a reduced level when the recorded measure of activity is above a threshold and to a higher level when the recorded measure of activity is below the threshold.

During operation the processing device executes a program of instructions that are stored at least temporarily in instruction memory 10. Addressing unit 11 successively supplies the addresses of the instructions to instruction memory 10 and in response instruction memory supplies addressed instructions to processing circuitry 12 for execution. Normally addressing unit 11 supplies successively incrementing addresses, but normal address incrementation may be affected by the execution of branch instructions. Branch instructions are any instructions that may cause a programmed jump in the instruction addresses, either as a result of applying a programmed offset to a current instruction address or by replacement with a programmed target address, usually dependent on a branch condition that is specified in the branch instruction. A branch instruction is said to be "taken" if a jump is effected, i.e. when the branch condition is met in case of a conditional branch instruction.

When processing circuitry 12 detects a branch instruction it causes activity monitor 16 to reset. Subsequently activity monitor 16 incrementally registers activity to build up a measure of activity A in the processing device after detection of the original branch instruction. The measure of activity A is for example a measurement of the number of times gates have switched in the circuit or a part thereof since activity monitor 16 has been reset. This can be measured for example from the power supply current consumed by the circuit or the part, given the supply voltage V and the switching capacitance per gate C, since it is known that the current is proportional to $A*C*V$.

Information about the detected branch instruction is stored in register 19. The information contains the address of the branch instruction and information to indicate whether the branch instruction has been taken. The mentioned branch instruction will now be referred to as "original" branch instruction. When processing circuitry 12 indicates that a next branch instruction has been detected this is signaled to branch history storage unit 14, which reads from activity monitor 16 the measure of activity A built up by activity monitor 16 from the time when the original branch instruction was signaled. The instructions following the original branch instruction up to and including the next branch instructions are called a "basic block" of instructions. Respective basic blocks each start with an instruction following a respective branch instruction and/or a target of a branch instruction and end at the next branch instruction.

Thus, branch history storage unit 14 records information derived from measures of activity that have been measured for respective basic blocks. For example, the measure of activity itself is recorded, replacing any previously recorded measure of activity. Branch history storage unit 14 stores the information derived from the measure of activity so that it can be retrieved on the basis of the address of the original branch instruction. Preferably, branch history storage unit 14 also stores the branch address of the original branch instruction and the information about taking of the original branch instruction.

Branch history storage unit 14 uses instruction addresses received from instruction addressing unit 11 to retrieve the recorded information about the measure of activity. When an instruction address corresponds to a branch instruction for which information about the measure of activity has been recorded branch history storage unit 14 supplies this information to control mode selection unit 18.

Mode selection unit 18 is arranged to adapt operation of the device dependent on the measured activity, so as to minimize power supply consumption during program execution within certain constraints. Mode selection dependent on activity is known per se. Therefore, mode selection unit 18 will not be described in detail. A typical constraint is execution time. The execution time of a program is the sum of the execution time of the executed basic blocks:

$$T=\text{sum over blocks } Nb*Tb$$

Herein Nb is the number of times a basic block is executed and Tb is the execution time of a basic block b. The execution time of the block is inversely proportional to the clock frequency that controls instruction execution. On the other hand, power supply consumption is the sum of the average power consumed during execution of the blocks:

$$E=\text{sum over blocks } Nb*Eb$$

Here Eb is the average power supply consumption during execution of a block b. The average power supply consumption is proportional to the average activity Ab of the circuit during execution of the block time the square of the power supply voltage.

Power supply consumption E can be reduced by reducing the power supply voltage, but when the power supply voltage is reduced, the maximum possible clock frequency is also reduced. Therefore, when the power supply voltage is reduced, the clock frequency needs to be reduced as well and this leads to an increase in execution time T. However, the ratio of the effect on power supply consumption E and execution time T differs between different blocks b, dependent on the activity Ab in the block. A power supply voltage reduction has a larger effect on power supply consumption of a block with higher activity Ab than on a block has a lower activity Ab, whereas the corresponding effect on execution time of the two blocks is the same.

Mode selection unit 18 uses this effect by selectively reducing the power supply voltage and clock frequency less, if at all, during execution of blocks for which lower activity has previously been recorded and more during execution of blocks for which higher activity has previously been recorded. When branch history storage unit 14 signals to mode selection unit 18 that a branch instruction has been encountered, branch history storage unit 14 signals information about the measure of activity previously involved with execution of the block that follows the branch instruction, if such information is available. On the basis of this information mode selection unit 18 selects a supply voltage and clock frequency and controls the circuit to operate at the selected supply voltage and clock frequency during execution of the instructions that follow the branch instruction.

If no information about the measure of activity is available for the branch instruction, branch history storage unit 14 does not signal the branch instruction, or signals the branch instruction and supplies a default value for the activity. In the former case mode selection unit 18 does not change the mode and in the latter case mode selection unit 18 changes the mode according to the default value. Of course, mode selection unit may also be arranged to set a predetermined mode when the absence of activity information is signaled for a branch instruction.

In addition, branch history storage unit 14 preferably uses recorded information to guide branch prediction for use in speculative execution. This is known per se. Based on information about the frequency with which the branch is taken, instruction addressing unit continues by addressing locations in memory 10 that follow the address of the branch instruction or that start from the branch target address of the branch instruction, dependent on which was executed most frequently previously. Processing circuitry 12 speculatively executes these instructions, until processing circuitry 12 has determined the outcome of the branch instruction. If the outcome was predicted correctly, the speculatively executed instructions are committed. If the outcome differs from the prediction a miss prediction is said to have occurred. In this case the speculative instructions are retracted and instruction addressing unit 11 is set to start supplying addresses from the correct address.

It should be appreciated that, although use of recorded measures of activity is preferably combined with branch prediction, it can be applied separately from branch prediction and even when no branch prediction is used. Whether or not branch prediction is used, any known technique for implementing branch history tables (that record information about branch instructions for the purpose of recording information to predict the outcome of branch instructions) can be used to implement recording of information about activity. These techniques will not be described in detail.

For example, an associative memory may be used in branch history storage unit 14 as an activity table memory 140. In this case, different memory locations in an activity table memory 140 may be assigned each for storing information for a respective branch instruction, so that the address of the branch instruction can be used to identify the memory location in order to update or retrieve the information for the branch instruction. Entries in the activity table memory 140 each contain for example at least two items:
Instruction address of branch instruction; and
Measure of activity.

In this case, processing circuitry 12 or instruction addressing unit 11 should supply the instruction address to branch history storage unit 14. In this case, branch history storage unit 14 may use a form of management to reassign memory locations for newly encountered branch instructions, for example by reusing the location for the least recently used or least frequently encountered branch instruction. When branch history storage unit 14 is also used for predicting the outcome of branches the entries contain at least three items:
Instruction address of branch instruction;
Measure of activity; and
Measure of frequency of branch being taken.

In this case, processing circuitry 12 should supply information about whether the branch was taken or not to branch history storage unit 14. The measure of activity and/or the measure of frequency may reflect statistical information accumulated from a number of executions, or merely information from a most recent execution. The measures may represent numbers or codes that refers to different numbers.

As another example, a part of the instruction address of the branch instruction may be used to address different memory locations in activity table memory 140 (e.g. a least significant part of the address), optionally the activity table memory 140 may be augmented with some measures to disambiguate different branch instructions with the same address part.

It should be noted that the technique used for storing the information about the measure of activity for different branch instructions need not be error free. As has been mentioned, activity table memory 140 may not contain sufficient memory to store information for all branch instructions, so that information about a subset of the branch instructions only is stored and a default assumption for the measure of activity will have to be made for other branch instructions. Similarly, for example, techniques for partial identification of branch instructions may be used that occasionally result in providing information about the measure of activity for the wrong branch instruction or in the wrong measure of activity or in signaling of branch instructions where there are no branch instructions. Such errors can be tolerated because they do lead to complete failure, but only to sub-optimal power supply consumption. This need not be a significant problem, for example if one of a number of confused branch instructions is executed much more frequently than the others, or if such errors occur infrequently.

Although the basic architecture for managing information in branch history storage unit 14 can be largely similarly to any architecture used for known management of information for branch prediction, it will be appreciated that some differences may exist.

For example, branch history storage unit 14 need not supply the information about the measure of activity to mode selection unit 18 so soon as customary for the prediction of branch instructions, or using a pipelined architecture, as is usual for branch prediction. Branch history storage unit 14 may even supply this information only after processing circuitry 12 has signaled that a branch instruction has been detected, or even after processing circuitry 12 has signaled the outcome of the branch instruction. This may be used for example to simplify storage of information in branch history storage unit 14, by using part of instruction addresses of branch instructions to identify information in branch history storage unit 14, the information being supplied only when processing circuitry 12 signals that a branch instruction has been detected for the address part.

As another example of an embodiment, branch history storage unit 14 records two measures of activity for each branch instruction, one for the case when the branch is taken and one for the case when the branch is not taken. Information supplied by processing circuitry 12, which indicates whether or not the branch has been taken, controls where branch history storage unit 14 stores the information from activity monitor 16. Similarly, this information from processing circuitry 12 determines which stored part of the information is supplied to mode selection unit 18.

As another example, an address of an instruction that follows the branch instruction during execution may be used to identify the information about the measure of activity. In this embodiment an instruction address of an instruction that follows a branch instruction is captured upon detection of a branch instruction and supplied to branch history storage unit 14 to identify the update of the information about the activity of the following instructions. During subsequent execution this identifying address may be compared with instruction addresses used during execution and the corresponding information about the measure of activity may be supplied when the instruction address equals the identifying address. Thus, information whether the branch is taken is automatically incorporated.

As yet another example, information about the measure of activity may be stored only for the most frequent or the most recent result of the branch, together with an indication of the branch result for which the information has been recorded. In this case branch history storage unit 14 preferably selects the information to be supplied to mode selection unit 18 dependent on the outcome of the branch as indicated by processing circuitry.

Again, as has been mentioned above, an amount of error in the information supplied to mode selection unit 18 can be tolerated. Hence, in the examples above, the information about the outcome of the branch may be ignored for example, so that the most frequently occurring outcome is supplied.

Similarly, it is not necessary that the measure of activity is determined for all instructions in a basic block and none outside the basic block. For example, if it is known that mode selection unit 18 will select a mode in response to signaling of branch only after a number of cycles after fetching the branch instructions, the measure of activity is preferably recorded from that number of cycles after the branch instruction and that number of cycles past a next branch instruction. Thus a more accurate prediction of the effect of mode changes is obtained. In general, the measure of activity is preferably determined for those instructions that are known to be executed in a changed mode in response to information from branch history storage unit 14.

Deviation from the optimal interval of monitoring activity results in sub-optimal decisions, which, however, may often be tolerated. As long as a measure of activity is determined for some part of a basic block improvements in power supply consumption can be realized.

Various forms of recording information about the measured activity may be used. For example, the measure of activity during the last execution of the basic block may be recorded. As another example, a running average of the activity over number of executions of the block may be recorded, for example, according to the formula $$I'b = w*Ab - (1-w)*Ib$$

where I'b and Ib are the newly recorded information and the previously recorded information for the block respectively and Ab is the measured activity during current execution of the block. Similarly, update of the information may be applied only if a measured activity does not differ too much from a previous activity. Alternatively the measured activity of several more recent executions of the block may be recorded, the median being supplied to mode selection unit 18. Any form of recording may be used that has predictive value for the next execution of the block.

Activity monitor 16 may measure activity in any known way. One example involves measuring cumulative current I supplied to processing circuitry 12 during execution of a number of instructions. The activity A follows from the relation I=AV. Given the mode selected by mode selection unit 18, the voltage V can be determined. With the voltage V and the cumulative current I the activity A can be computed. Although the invention has been described in terms of a reset of activity monitor 16, in response to detection of a branch instruction it is of course also possible instead to sample a current cumulated activity value and to subtract that value from the current activity value at the end of the measurement interval. In this case activity monitor 16 may be allowed to run on.

Although the invention has been described in terms of a single activity measurement of the activity of the whole device or of processing circuitry, it will be appreciated that, without deviating from the invention a plurality of different activity measurements may be made and recorded in parallel, for example for different components of the device or of the processing circuitry 12. In this case mode selection unit 18 may adapt the modes of the different parts in different ways.

Although an example has been given where mode selection unit 18 adapt voltage and frequency, it will be appreciated that any parameters that affect power supply consumption may be adapted, for example by assigning instruction execution to different processing units dependent on the expected activity (e.g. to a slow and low power unit or to a fast and high power unit). Similarly, although an example has been given in which power consumption has to be minimized under the constraint of not exceeding a maximum execution time, any other form of constraint may be used, for example a constraint on maximum execution time for a part of a program or a running constraint for a number of next instructions. In fact other constraints than execution time may be involved. Similarly, the measured activity may be used to optimize a parameter other than power supply consumption.

Furthermore, any algorithm may be used to select the different modes dependent on the recorded activity. In a simple algorithm, one of two power consumption modes is selected for a basic block or part of it, dependent on whether the measured activity for the blocks is below or above a threshold. In this case, the threshold may be adapted dependent on the amount of execution time that is available. In more complicated examples, selection may be made between more than two different modes. In other examples, information about the structure of the program, e.g. the number of times Nb that different basic blocks b still need to be executed may be used to guide the selection of the mode for the different blocks so that the overall constraint is met and power supply consumption is minimized.

Also, it is not necessary that mode selection is performed "on the fly" as execution of the program progresses. In another embodiment, the recorded information about the measure of activity for different basic blocks is read from branch history storage unit 14 at some time and used to search for an assignment of modes to different basic blocks for a future execution of the program under the assumption that the measured activity will repeat itself, or even for a rearrangement of the program to reduce power supply consumption. In this case the known mathematical formulas for power consumption and execution time may be used and a search may be made for assignment of modes to the different basic blocks. For this purpose a recording of a simple sum of activities in different basic blocks in branch history storage unit 14 suffices. Furthermore, instructions may be added to the program to set the selected modes.

Although detection of branch instructions is used to trigger updates and supply of information about the measure of activity, it will be appreciated that storage of the information need not involve the instruction address of the branch instruction. Instead the address of an instruction in a basic block may be used, e.g. an address of an instruction at or near at the start of the basic block. In this case, detection of the branch instruction is used as a trigger and the address of the instruction in the block is used to select the information for retrieval and/or update in response to the trigger. Two instruction addresses may even be used, one (e.g. at the end of the basic block) for selecting the information for updating and another (e.g. at the start of the basic block) for retrieval.

The invention claimed is:

1. An instruction processing apparatus, comprising: an instruction memory; an instruction addressing unit coupled to supply instruction addresses to the instruction memory; instruction processing circuitry coupled to receive and execute addressed instructions from the instruction memory, the instructions including branch instructions, the instruction processing circuitry being coupled to the instruction addressing unit to control the instruction addresses in response to the branch instructions; an activity monitor for monitoring activity in at least a part of the apparatus during execution of the instructions, and for supplying measures of activity that occur during execution of instructions following the respective ones of the branch instructions; an activity table memory coupled to the activity monitor, the activity table memory being arranged to store entries that record information about the measures of activity associated with the respective ones of the branch instructions respectively.

2. An instruction processing apparatus according to claim 1, wherein the activity table memory is arranged to capture information about the measured activity during execution of instructions starting from an instruction executed after the branch instruction at least until a next executed branch instruction.

3. An instruction processing apparatus according to claim 1, comprising a mode select unit for controlling a mode of operation of the processing circuitry that affects power consumption by the processing circuitry, the activity table memory having an output coupled to the mode select unit to output data derived from the information about the measure of activity for a particular one of the branch instructions, upon detection of fetching and/or execution of the particular one of tile branch instructions, for controlling selection of the mode.

4. An instruction processing apparatus according to claim 3, wherein the activity table memory has locations for a predetermined number of branch instructions, the processing apparatus comprising a table memory management unit for selecting for which of the branch instructions the entries are retained in said locations, and for directing supply of default information to the mode select unit when no information has been retained for the particular one of the branch instructions.

5. An instruction processing apparatus according to claim 1, wherein the activity table memory is arranged to retain information about the measure of activity for both the case when the branch is taken and when the branch is not taken respectively, the processing-circuitry signaling which information should be updated dependent on the outcome of the branch.

6. An instruction processing apparatus according to claim 5, comprising a mode select unit for adapting a mode of operation of the processing circuitry that affects power consumption by the processing circuitry, the activity table memory having an output coupled to the mode select unit to output data derived from the information about the measure of activity for a particular one of the branch instructions, upon detection of fetching and/or execution of the particular one of the branch instructions, for controlling selection of the mode, the information being selected dependent on whether the particular one of the branch instructions is taken or not.

7. An instruction processing apparatus according to claim 1, wherein the activity table memory is part of a branch prediction unit, inflation about a frequency with which the respective ones of the branch instructions are taken being recorded in said entries, for predicting whether the branch instructions, when encountered subsequently, will be taken.

8. A method of executing a program of instructions, the method comprising detecting the execution of branch instructions; determining respective measures of activity of processing circuitry, each measure of activity during execution of instructions following a respective one of the branch instructions in response to detection of the branch instructions; recording inflation about the respective measures of activity in association information that identifies the respective one of the branch instructions.

9. A method of executing a program of instructions according to claim 8, the method comprising using the information about the recorded measures of activity to select respective power consumption setting modes to be used during execution of at least part of the instructions following the respective ones of the branch instructions.

10. A method of executing a program of instructions according to claim 9, wherein said selecting respective power consumption setting modes is performed statically, in advance of execution of the program, using accumulated measures of activity from a previous run of the program for respective blocks of instructions following respective ones of the branch instructions.

11. A method of executing a program of instructions according to claim 9, wherein said selecting respective power consumption setting modes is performed dynamically during execution of the program, dependent on current information about the measure of activity for instructions following a particular one of the branch instructions.

* * * * *